(12) United States Patent
Oh et al.

(10) Patent No.: US 11,410,355 B2
(45) Date of Patent: Aug. 9, 2022

(54) METHOD AND APPARATUS FOR CREATING DIGITAL CLOTHING

(71) Applicant: CLO VIRTUAL FASHION INC., Seoul (KR)

(72) Inventors: Seung Woo Oh, Seoul (KR); Kyoung Ae Bang, Seoul (KR)

(73) Assignee: CLO VIRTUAL FASHION INC., Seoul (KR)

( * ) Notice: Subject to any disclaimer, the term of this patent is extended or adjusted under 35 U.S.C. 154(b) by 0 days.

(21) Appl. No.: 16/925,878

(22) Filed: Jul. 10, 2020

(65) Prior Publication Data

US 2020/0342641 A1    Oct. 29, 2020

Related U.S. Application Data

(63) Continuation of application No. 14/921,269, filed on Oct. 23, 2015, now Pat. No. 10,733,773.

(30) Foreign Application Priority Data

Apr. 27, 2015    (KR) .................. 10-2015-0059086

(51) Int. Cl.
*G06T 11/20* (2006.01)
*A41H 3/00* (2006.01)

(52) U.S. Cl.
CPC .............. *G06T 11/20* (2013.01); *A41H 3/007* (2013.01); *G06T 11/203* (2013.01); *G05B 2219/2626* (2013.01); *G05B 2219/45195* (2013.01); *G06T 2210/16* (2013.01)

(58) Field of Classification Search
CPC ............. G05B 2219/2626; G05B 2219/45195
See application file for complete search history.

(56) References Cited

U.S. PATENT DOCUMENTS

| 2004/0049309 | A1 | 3/2004 | Gardner et al. |
|---|---|---|---|
| 2011/0298897 | A1 | 12/2011 | Sareen et al. |
| 2013/0057544 | A1 | 3/2013 | Oh |
| 2014/0135971 | A1 | 5/2014 | Park |
| 2016/0078650 | A1 | 3/2016 | Kishikawa et al. |

FOREIGN PATENT DOCUMENTS

| JP | 6-301763 A | 10/1994 |
|---|---|---|
| JP | 2014-182670 A | 9/2014 |
| KR | 10-2011-0119260 A | 11/2011 |

OTHER PUBLICATIONS

Autodesk, AutoCAD Architecture 2011 User's Guide, Mar. 2010, pp. 2089-2090.*
Volino, Pascal et al., "Resolving surface collisions through intersection contour minimization." vol. 25., No. 3., ACM, 2006. (6 pages).
CLO 3D 2011 Marvelous Designer Manual (2014).
Korean Office Action dated Mar. 28, 2016 in counterpart Korean Application No. 10-2015-0059086 (5 pages in Korean).
Korean Notice of Allowance dated Sep. 24, 2016, in counterpart Korean Application No. 10-2015-0059086 (2 pages in Korean).

* cited by examiner

*Primary Examiner* — Matthew Salvucci
(74) *Attorney, Agent, or Firm* — NSIP Law

(57) ABSTRACT

A computer simulation technology that processes 2D clothing patterns and thus creates digital clothing.
The purpose of the present disclosure is to easily adjust a length of another segment to be sewn the same as a length of a selected segment on a pattern when free-sewing.

9 Claims, 13 Drawing Sheets

METHOD AND APPARATUS FOR CREATING DIGITAL CLOTHING

CROSS-REFERENCE TO RELATED APPLICATION(S)

This application is a continuation of U.S. patent application Ser. No. 14/921,269 filed on Oct. 23, 2015 which claims the benefit under 35 U.S.C. § 119(a) of Korean Patent Application No. 10-2015-0059086, filed on Apr. 27, 2015, in the Korean Intellectual Property Office, the entire disclosure of which is incorporated herein by reference for all purposes.

BACKGROUND

1. Field

The following description relates to computer simulation technology that processes 2D clothing patterns and thus creates digital clothing.

2. Description of the Related Art

Current clothing simulation technology is used in various fields ranging from the fashion industry to games, animations, and movie visual effects. Also, virtual clothing is a billion-dollar market. Such a technology is to model textiles in mesh having the mass so as to simulate movements of the textiles according to the outer movements of the avatar wearing the clothes, wind, lights, etc.

In a sewing simulation method to create digital clothing by using patterns, there are segment sewing and free sewing for a method of sewing each of the different two patterns.

Segment sewing is sewing the two selected segments among the segments that are separated by dots; and free sewing is sewing two segments with the adjusted length that a user wants by freely adjusting each length of the two segments to be sewn.

More specifically, in the case of free sewing, if a user adjusts the two segments to be the same, accuracy is required when adjusting the length of another segment to be the same as the length of the first selected segment through input device e.g., mouse.

In free sewing, even when two segments having the length being different from each other are sewn together, the digital fabric, which stretches well, including the two segments may seem as being sewn with the same length in the same manner as real clothing. However, in the case of the fabric not stretching well, wrinkles may be created on the digital clothing.

Furthermore, in the case the lengths of two segments to be sewn in the free-sewing manner are set to be different, a user is required to recognize how long or short the segment selected later is, during the process of adjusting the segment selected later.

Also, when the difference between each length of the two segments to be sewn together is too large for the two segments to be sewn together, displaying a warning sign is required so as to enable a user to recognize it during the process of adjusting the segment selected later.

SUMMARY

The purpose of the present invention is to allow the user, during free sewing, to easily adjust the length of one digital pattern's line segments to match that of another's.

The purpose of the present disclosure is to, during free sewing, calculate and display the difference between each length of a selected segment on the pattern and another segment to be sewn thereto so as to perform the accurate sewing.

Another purpose of the present disclosure is to, during free sewing, recognize a user a warning sign when the difference between each length of the selected segment on the pattern and another segment to be sewn thereto is too large for the two segments to be sewn together.

In one general aspect, a method of creating digital clothing includes, wherein the method is executable by a computing device including a computing element and a storage element storing patterns and draped digital clothing: setting a first selected segment by inputting the first selected segment to be sewn on a first segment on a pattern; setting a second selected segment; and draping the digital clothing by processing the first and second selected segments according to sewing instructions so as to create 3D digital clothing, wherein the setting of the second selected segment includes: inputting a starting point of a second selected segment onto at least one second segment, which is to be sewn to the first selected segment; inputting an ending point, which, upon starting a point-clicking process at the starting point located on a second segment, is the closest in distance to a point, where the point-clicking process occurs, on the second segment that includes the input starting point; and setting, as the second selected segment, a section of the second segment between the input starting point and the input ending point.

The first and second segments may be at least one of a straight line, a curved line, a multi-branch line, and shapes that include polygons and circles.

The setting of the second selected segment may further include, between the inputting of the starting point and the inputting of the ending point: detecting a current cursor position; and displaying a candidate for the ending point by determining, as the candidate for the ending point of the second selected segment, a point, which is the closest in distance to the current detected cursor position and which makes the second selected segment a same as a length of the first selected segment along the second segment that includes the input starting point, wherein the second selected segment is made by connecting the input starting point to such a point.

The setting of the second selected segment may further include: in response to a difference between the current cursor position and the determined candidate for the ending point being lower than a reference value, moving the cursor position to a position of the determined candidate for the ending point and displaying the cursor position.

The setting of the second selected segment may further include: calculating and displaying at least one of: the length of the first selected segment and a length of a line, which is acquired by connecting the starting point, input along the second segment, to a point that is on the second segment and that is the closest in distance to the current cursor position.

The setting of the second selected segment may further include: displaying a difference value between the length of the first selected segment and a length of a line, which is acquired by connecting the starting point, input along the second segment, to the point that is on the second segment and that is the closest in distance to the current cursor position.

The setting of the second selected segment may further include: in response to the difference value being greater than a reference value, displaying a warning sign.

The displaying of the warning sign may include: in response to the difference value being greater than the reference value, displaying the warning sign by changing colors of the calculated length and the difference value.

Other features and aspects may be apparent from the following detailed description, the drawings, and the claims.

Figure 1:
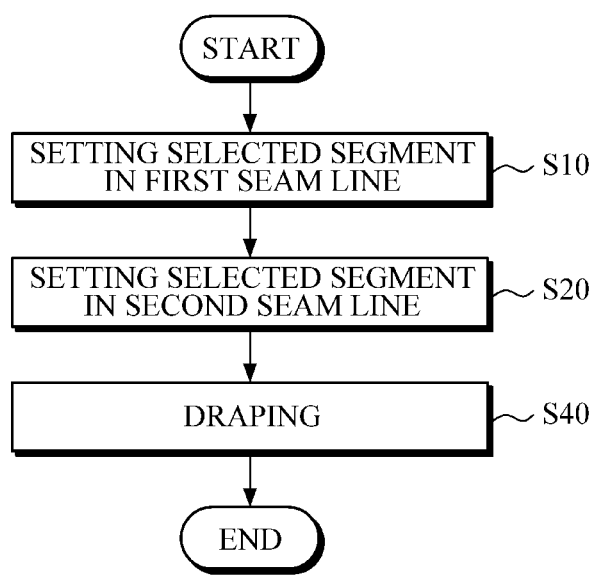
FIG. 1 is a flowchart illustrating a method of creating digital clothing according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Descriptions incorporated herein is omitted to enhance clarity and conciseness, and similar reference numerals are used to refer to similar elements, features, and structures throughout the drawings and the detailed description. Throughout the specification, unless explicitly described to the contrary, the word "comprise" and variations such as "comprises" or "comprising" will be understood to imply the inclusion of stated elements but not the exclusion of any other elements. In addition, the components, devices, and units described herein indicate "a block configured to enable the systems of hardware or software to be changed or plugged in", which is, in other words, one unit or block that performs functions in hardware or software.

The proposed method of creating digital clothing and the apparatus thereof, and storage media, on which a computer program to execute the method thereof is stored, may be applied to the field of 3D simulation technology.

Digital clothing is created through a computer simulation creating program, which reflects the actual process of making clothes. For example, a clothing manufacturer draws 2D patterns of clothes and then drapes the 2D patterns on an avatar model that is to wear the clothes. The draping result is rendered, which is then shown, and then the 3D virtual clothes are output onto a screen. The avatar model and the 2D clothes patterns may be drawn by the user through a computer program or the user may select preloaded patterns for use. In the case the user wishes to draw the 2D patterns, the user may do so by using various types of graphic software, CAD programs, or the provided tool for making 2D patterns.

In a simulation method of draping digital clothing, a draping simulation method includes: 1) meshing patterns, 2) positioning patterns around an avatar, 3) determining whether the patterns intersect with the avatar, 4) generating intersection removal force, and 5) performing the draping simulation. Meshing patterns may be performed by applying the Delaunay Triangulation technique, and the draping simulation process may be performed using the method that is disclosed in [Pascal Volino, Nadia MagnenatThalmann: Resolving surface collisions through intersection contour minimization. ACM Trans. Graph. 25 (3): 1154-1159 (2006)].

FIG. 1 is a flowchart illustrating a method of creating digital clothing according to an exemplary embodiment.

In one exemplary embodiment, a method of creating digital clothing may include setting a selected segment in the first seam line (hereinafter, referred to as 'first selected segment') in 10, setting a selected segment in the second seam line (hereinafter, referred to as 'second selected segment') in 20, and draping digital clothing in 40, wherein the method may be performed by a computing device, which includes a computing element and a storage element that stores patterns and the draped digital clothing.

In one exemplary embodiment, the operation 10 includes setting a first selected segment by inputting the first selected segment, which is to be sewn on a segment in the first seam line (i.e., a segment to be sewn, which is on the first seam line; hereinafter, referred to as 'first segment') on the pattern. The operation 10 may include inputting the first selected segment, which is one of the two lines to be sewn. A method of inputting the first selected segment is directly selecting the part to be sewn through input devices e.g., a mouse, a touch pen, a keyboard; or enabling a user to select outlines on one pattern, which are provided through a computer program so that a user can select.

In the case in which the first selected segment to be directly sewn is selected through input devices, a starting point and an ending point of the first selected segment are input and selected. In the case in which a cursor, which is output within a screen by input devices, e.g., a mouse and a touch pen, does not exist on any segment of a pattern, a point on a segment that is the closest in distance to a current cursor position may be selected as a starting point or an ending point if the current cursor position has been selected as the starting point or the ending point. The operation 10 may be specifically described with reference to FIGS. 3 and 4.

A pattern may include at least one of a 2D pattern and a 3D pattern, wherein the 2D pattern is acquired after simulating, to a 2D object, a clothing sample that is cut for the design of 3D clothing in a computer, and wherein the 3D pattern is acquired after simulating the clothing sample to a 3D object. The 2D pattern is acquired after simulating, to a 2D object, the clothing sample that is cut for the design of the digital clothing in a computer. The 2D patterns are created according to the set attributes of textiles in terms of appearance and physical properties. To show the appearance of 2D patterns, the input of outline information of the 2D patterns is required. The outlines and vertices of the patterns may be created by using the CAD tool or various graphic programs or selecting the patterns from a storage device that includes 2D patterns according to the clothing types. The inside of the 2D patterns of which appearance is determined by the outlines may consist of meshes e.g., triangles or rectangles. The meshes may consist of springs that connect grid points to each other. The 2D patterns' material properties, wrinkling, drapability, etc., may be shown through the grid points and the springs.

The operation 20 of setting the second selected segment may include inputting a starting point in 21, inputting an ending point in 30, and setting the second selected segment in 31. The second selected segment is sewn to the first selected segment, which will be specifically described later.

In the operation 40 of draping the digital clothing, the first and second selected segments are sewn together in response to the sewing instructions so that digital clothing is created. In the operation 40 of draping the digital clothing, 2D patterns are positioned around an avatar model and are sewn to each other along the selected segments that a user has set.

In general, a term 'draping' indicates a technique of creating designs as directly draping fabric onto someone's body, or completing the designs in three dimensions as cutting darts and seams of designated design. The 'draping' in the present disclosure indicates a process of creating 3D clothes from 2D patterns through computer programs. If the selected segment to be sewn is input onto the 2D patterns, the digital clothing is created i.e., is draped onto the 3D object as the 2D patterns are combined. The operation 40 will be specifically described later with reference to FIGS. 10 and 11.

Figure 2:
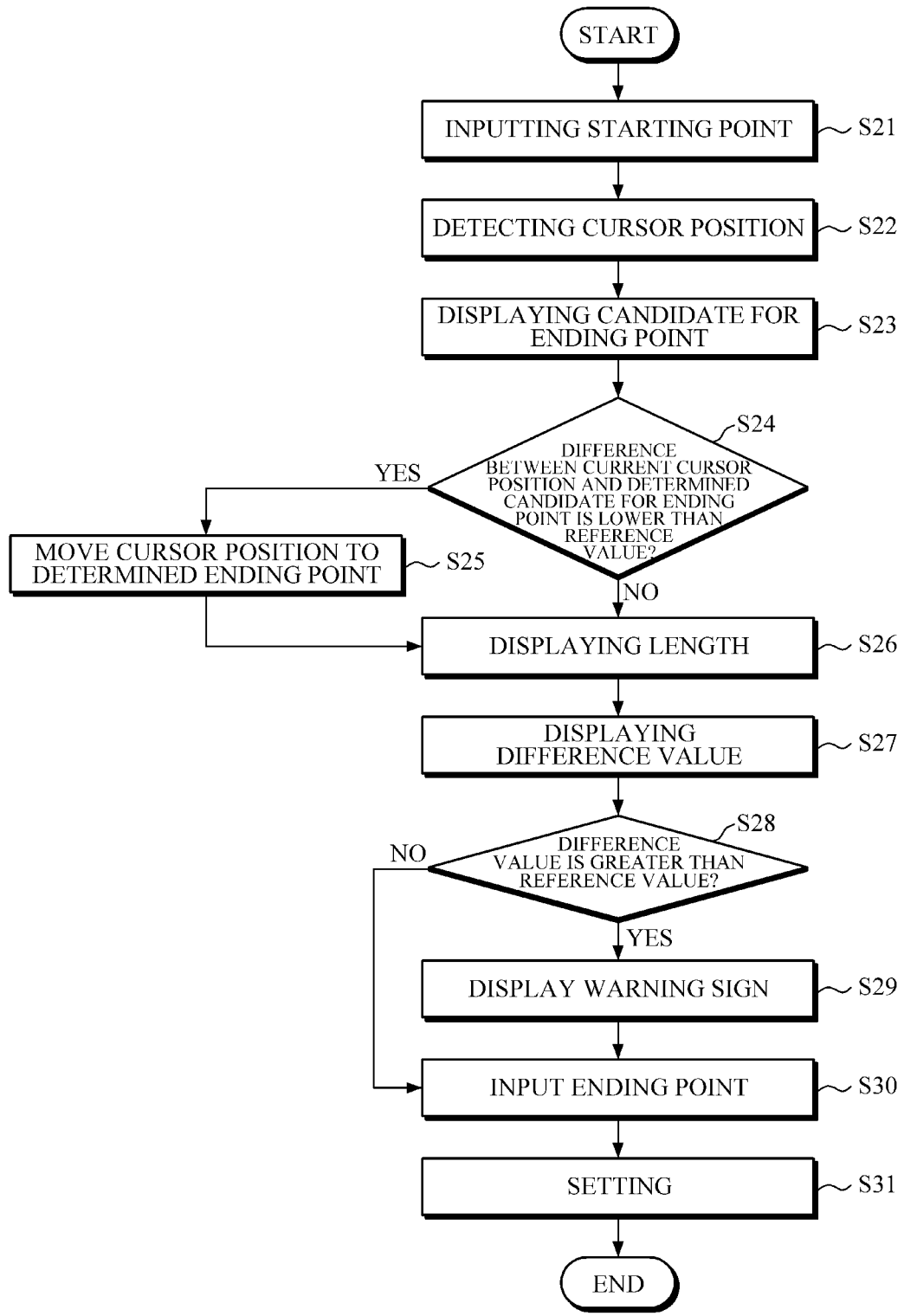
FIG. 2 is a detailed flowchart illustrating an operation of setting a selected segment in the second seam line according to an exemplary embodiment.

FIG. 2 is a detailed flowchart illustrating an operation of setting a second selected segment according to an exemplary embodiment.

An operation 20 of setting the second selected segment includes inputting a starting point in 21, inputting an ending point, and setting the second selected segment in 31.

The operation 21 includes inputting a starting point of a second selected segment on at least one segment in the second seam line (i.e., a segment to be sewn, which is on the second seam line; hereinafter, referred to as 'second segment'), which is to be sewn to the first selected segment. The starting point of the second selected segment may be input through input devices e.g., a mouse, a touch pen, a keyboard, etc. In the case in which a cursor, which is output within a screen by input devices, e.g., a mouse and a touch pen, does not exist on any segment on a 2D pattern, a point on a segment that is the closest in distance to a current cursor position may be selected as a starting point if the current cursor position has been selected as the starting point. The operation 21 will be specifically described later with reference to FIG. 5.

The operation 30 includes inputting an ending point, which, upon starting the point-clicking process at the starting point located on the second segment, is the closest in distance to a point, where the point-clicking process occurs, on the second segment that includes the input starting point. If the current cursor position is the closest in distance to the second segment, which includes the input starting point, among a plurality of second segments, the point that is the closest to the position, in which the point-clicking process has occurred, is input as an ending point. In the case the point-clicking process occurs when the current cursor is closer to another second segment than the second segment that includes the input starting point, the ending point may not be input. The ending point may be selected so that a length of the second selected segment is the same as that of the first selected segment, which exemplary embodiments are not limited thereto, and the length of the second selected segment may be different from the length of the first selected segment.

The operation 31 includes setting, as the second selected segment, the section of the second segment between the input starting point and the input ending point. If the length of the first selected segment is the same as the second selected segment, the digital clothing may be sewn without the wrinkles thereon. If the lengths of the first and second selected segments are not the same, wrinkles are created on the selected segment with the longer length, thus making aesthetic effects. However, even if the lengths of the first and second selected segments are not the same, the wrinkles may not be created according to how much the fabric stretches.

The first and second segments may be at least one of a straight line, a curved line, a multi-branch line, and shapes that include polygons and circles. In the case of the shape of the pattern being a circle, if the entire border of the circle is sewn, the first segment or the second segment may a circle. If the partial border of the circle is sewn, the first segment or the second segment may be a curved line. Various shapes of the first and second segments will be specifically described with reference to FIG. 12.

In a method of creating digital clothing, the operation 20 may further include detecting a cursor position in 22 and displaying a candidate of an ending point in 23 between the operation 21 and the operation 30.

The operation 22 includes detecting a current cursor position.

The operation 23 includes: determining, as the candidate for the ending point of the second selected segment, a point, which is the closest in distance to the current detected cursor position and which makes the second selected segment the same as the length of the first selected segment along the second segment that includes the input starting point, wherein the second selected segment is made by connecting the input starting point to such a point, and then displaying such a candidate. As the candidate is shown, the ending point on the second selected segment on the pattern may be easily chosen to be the same as the first selected segment. The operation 23 may be specifically described later with reference to FIG. 6.

The operation 20 may further include moving a cursor position in 24 and 25. In the operations 24 and 25, the cursor is moved to the position of the determined candidate for the ending point and displayed in 25 if the difference between the current cursor position and the determined candidate for the ending point is lower than a reference value. For example, the reference value may be 15 pixels (px). The reference value may be set freely by a user. If a cursor is located around the candidate for the ending point, the cursor is moved onto the candidate for the ending point so that the second selected segment may be easily set to be the same as the first selected segment. The operations 24 and 25 will be specifically described later with reference to FIG. 7.

The operation 31 may further include displaying a length in 26. The operation 26 includes calculating at least one of: the length of the first selected segment and the length of the line, which is acquired by connecting the starting point, input along the second segment, to the point that is on the second segment and that is the closest in distance to the current cursor position, which is then displayed in number. The line may be consistently monitored, which is acquired by connecting the starting point, which is input along the second segment changed while the cursor is moved, to the point that is on the second segment and that is the closest in distance to the current cursor position. The operation 26 will be specifically described later with reference to FIG. 7.

The method of creating digital clothing may further include displaying the difference value in 27. The operation 27 includes displaying, in number, the difference value between the length of the first selected segment and the length of the line, which is acquired by connecting the starting point, input along the second segment, to the point that is on the second segment and that is the closest in distance to the current cursor position. A user may check the length of the first selected segment and the length of the line, which is acquired by connecting the starting point, input along the second segment, to the point that is on the second segment and that is the closest in distance to the current cursor position. Furthermore, in the operation 27, a user may check the difference value therebetween. A user may check the difference so as to set the length of the first selected segment to be the same as the length of the second selected segment. The operation 27 may be specifically described later with reference to FIGS. 7, 8, and 9.

The operation 20 may include displaying a warning sign in 28 and 29. In the operations 28 and 29, a warning sign is displayed when the difference value is greater than a reference value. In the operations 28 and 29, when the difference value is greater than a reference value, the warning sign is displayed in 29 by changing the colors of the calculated length and the difference value. If the second selected segment is shorter or longer than the first selected segment, wrinkles may be created when patterns is sewn. In other words, depending on whether the wrinkles are created or not when the first and second selected segments are sewn together, the difference value may be displayed in different color. For example, the difference value may be displayed in red. If the difference value is greater than a reference value, the warning sign may be displayed while the difference value is displayed in red. Whether wrinkles are created on the 3D pattern may depend on the sewing method, the types of fabric, etc., wherein the 3D pattern is created after the first and second selected segments are sewn together and then through the draping process. For example, knit and chiffon stretching well do not create wrinkles if the difference between the first and second selected segments is lower than one inch. Cotton and denim not stretching well may not create wrinkles if the difference between the first and second selected segments is lower than one centimeter.

Non-volatile media may store computer programs to which a method of creating digital clothing is applied. The method of creating digital clothing may be created to be a downloadable computer program and stored in non-volatile computer-readable storage media, which, for example, includes read-only memory (ROM), random access memory (RAM), CD-ROM, magnetic tape, floppy disks, optical data storage devices, etc., and also implemented in the form of carrier wave (e.g., transmission via the internet).

Figure 3:
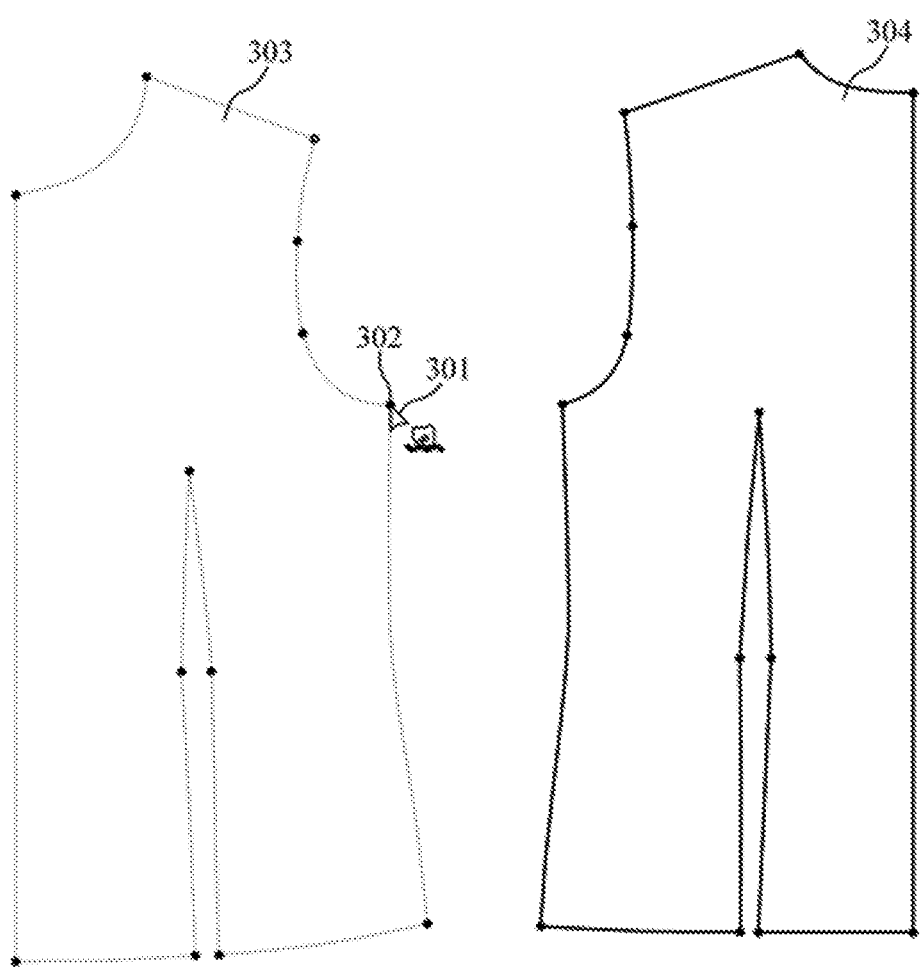
FIG. 3 is a diagram illustrating an example of a method of setting a selected segment in the first seam line.

FIG. 3 is a diagram illustrating an example of a method of setting a first selected segment. FIG. 3 illustrates two patterns 303 and 304 to be sewn, a starting point 302 of a first selected segment, and a cursor 301. The cursor 301, which is the position that input devices e.g., a mouse and a touch pen display on a screen, is positioned at one point 302 on the pattern 303. If the cursor 301 selects any one point on the pattern, the selected point may be a starting point of the first selected segment. In other words, if the cursor 301 selects any one point on the segment on the pattern, the selected point may be the starting point of the first selected segment, wherein the point is input through input devices. In FIG. 3, the segments to be sewn on the pattern are between each of the points on the pattern. In FIG. 3, the segments to be sewn on the pattern are set as an outline of the pattern, which exemplary embodiments are not limited thereto; and any segment, which is acquired after two points on the pattern are connected, may be set as the segment to be sewn. The cursor 301 is not positioned on the segment on any one pattern, and if a current cursor position is chosen as the starting point, the point on the segment on the pattern that is closest in distance to the current cursor position may be selected as the starting point.

Figure 4:
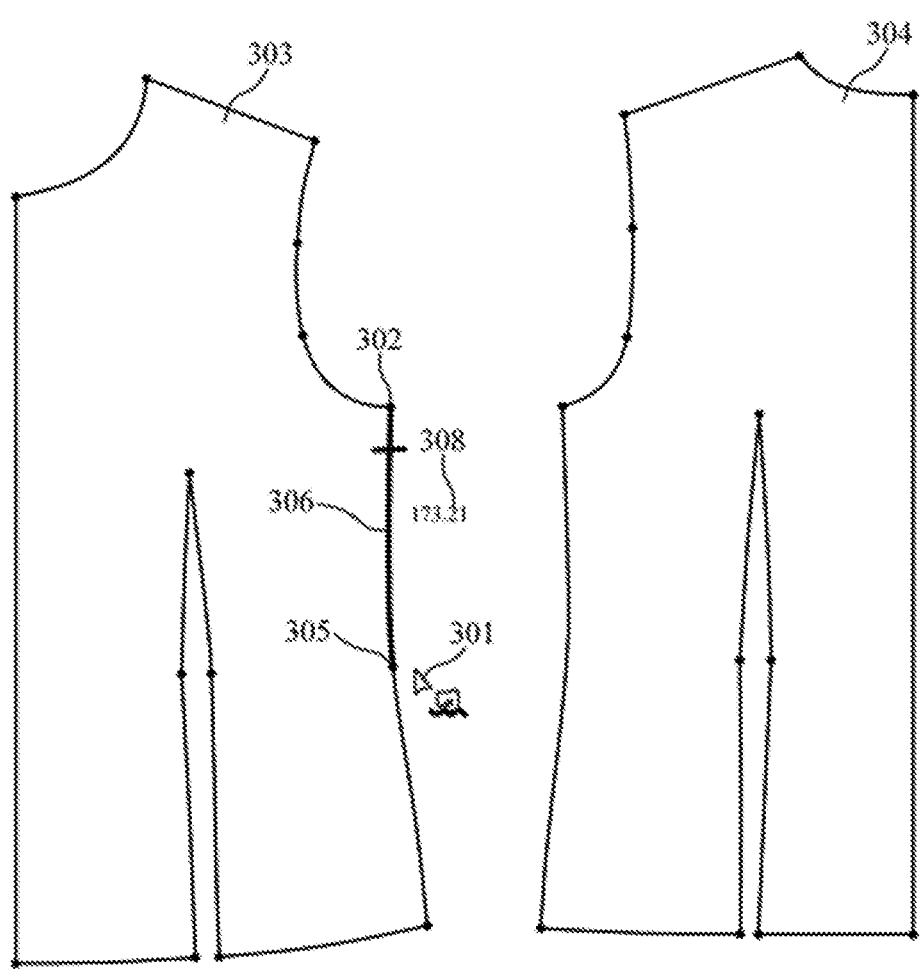
FIG. 4 is a diagram illustrating another example of setting a selected segment in the first seam line.

FIG. 4 is a diagram illustrating another example of an operation of setting a first selected segment. FIG. 4 illustrates: two patterns 303 and 304 to be sewn; a starting point 302 of the first selected segment; an ending point 305 of the first selected segment; a first selected segment 306; a length 308 of the first selected segment; and a cursor 301. As in FIG. 3, a user may select the starting point 302 on the first selected segment and then select, as the ending point 305, any point on the first selected segment, which a user wants to select, so as to set the first selected segment 306. When an ending point of the first selected segment 306 is selected, in the case in which a cursor, which is output within a screen by input devices, e.g., a mouse and a touch pen, does not exist on any segment of a 2D pattern, a point on a segment that is the closest in distance to a current cursor position may be selected as the ending point 305 if the current cursor position has been selected as the ending point. After a user inputs the starting point on the first segment, the length of the line may be displayed, wherein the line is acquired after the starting point is connected to the point that is on the first segment and that is closest in distance to the current cursor position. According to the movement of the cursor, the length of the line may be changed, which is acquired after the starting point is connected to the point that is on the segment and that is the closest in distance to the cursor. Once the ending point 305 of the first selected segment is selected, its length 308 is set. A user may set the length 308 in various units e.g., cm, mm, m, inch, etc.

Figure 5:
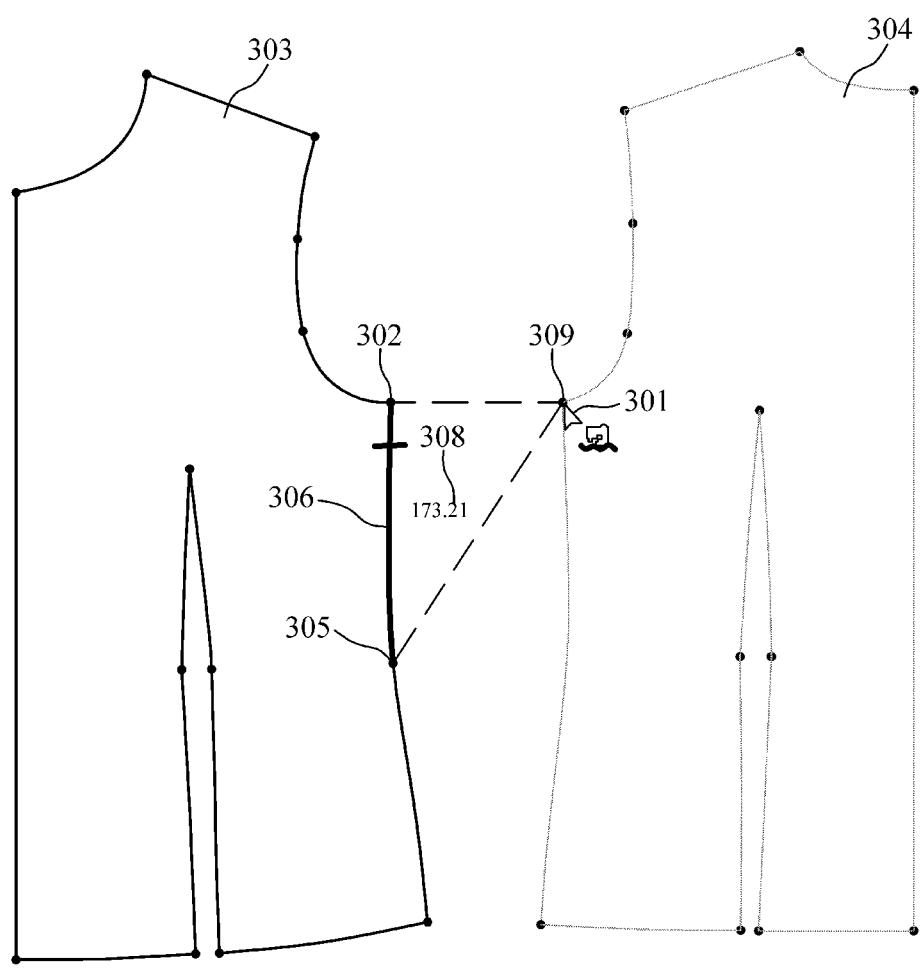
FIG. 5 is a diagram illustrating an example of setting a selected segment in the second seam line.

FIG. 5 is a diagram illustrating an example of setting a second selected segment. FIG. 5 illustrates two patterns 303 and 304 to be sewn; a starting point 302 of the first selected segment; an ending point 305 of the first selected segment; a first selected segment 306; a length 308 of the first selected segment; a starting point 309 of the second selected segment; and a cursor 301. The cursor 301, which is the position that input devices e.g., a mouse and a touch pen display on a screen, is positioned at one point 309 on the pattern 304. If the cursor 301 selects any one point on the pattern, the selected point may be a starting point of the second selected segment. In other words, if the cursor 301 selects any one point on the second segment on the pattern, the selected point may be the starting point of the second selected segment, wherein the point is input through input devices. In FIG. 5, the segments to be sewn on the pattern are between each of the points on the pattern. In FIG. 5, the segments to be sewn on the pattern are set as an outline of the pattern, which exemplary embodiments are not limited thereto; and any segment, which is acquired after two points on the pattern are connected, may be set as the segment to be sewn. The cursor 301 is not positioned on the segment on any one pattern, and if a current cursor position is chosen as the starting point of the second selected segment, the point on the segment on the pattern that is closest in distance to the current cursor position may be selected as the starting point.

Figure 6:
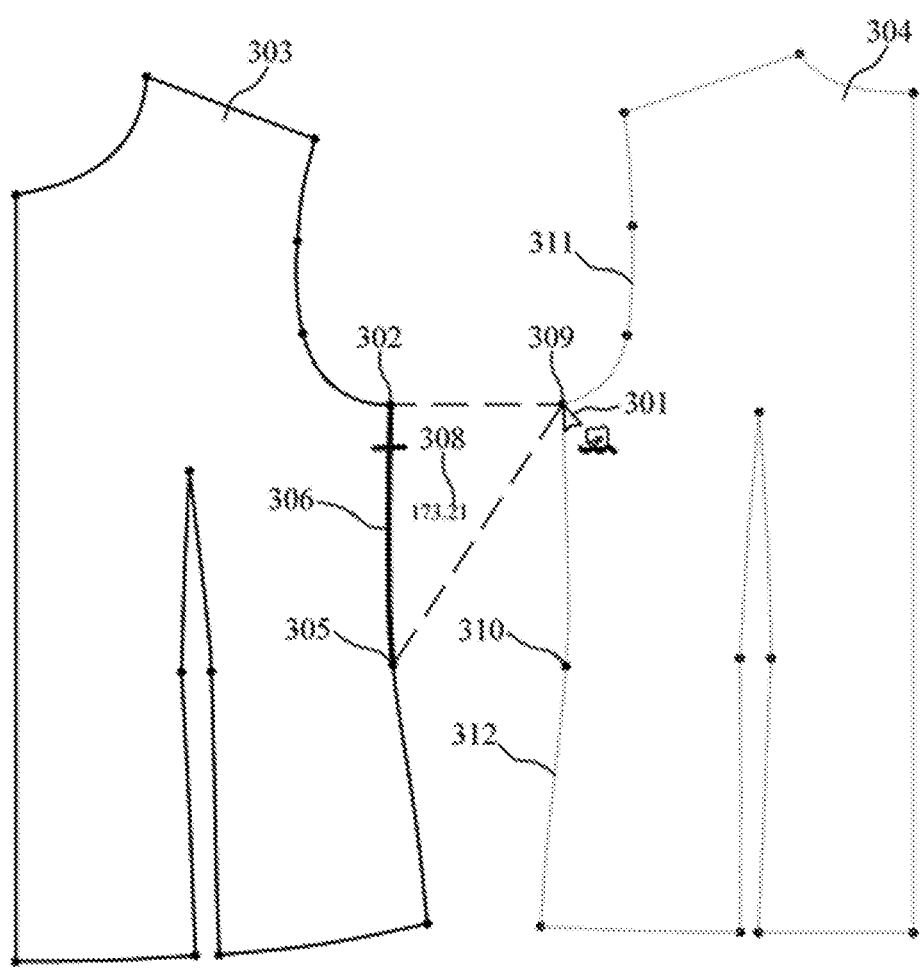
FIG. 6 is a diagram illustrating an example of displaying a candidate for an ending point.

FIG. 6 is a diagram illustrating an example of displaying a candidate for an ending point. FIG. 6 illustrates: two patterns 303 and 304 to be sewn; a starting point 302 of the first selected segment; an ending point 305 of the first selected segment; a first selected segment 306; a length 308 of the first selected segment; a starting point 309 of the second selected segment; a candidate 310 for an ending point; and a cursor 301. If the starting point 309 of the second selected segment is input, a point is displayed as the candidate 310 for the ending point of the second selected segment, wherein the point is the closest in distance to the position of the current detected cursor 301 and makes the second selected segment the same as the length of the first selected segment along the second segment that includes the input starting point 309, wherein the second selected segment is made by connecting the input starting point 309 to such a point. Since the current detected cursor 301 is closer to a second segment 312 of the second segments 311 and 312 that include the starting point 309 of the second selected segment, a candidate 310 for the ending point is generated on the second segment 312, wherein the second segments 311 and 312 meet together on the same point, which is the starting point 309. If the cursor 301 is closer to the second segment 311, the candidate 310 may be generated on the second segment 311.

Figure 7:
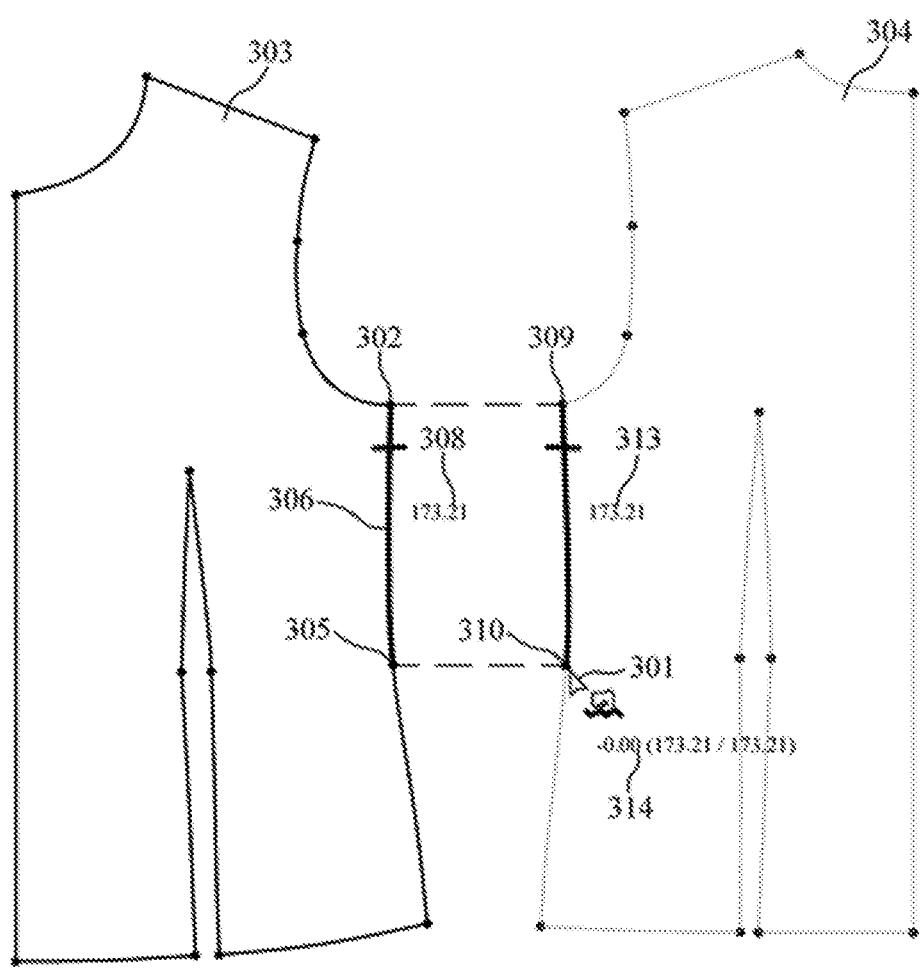
FIG. 7 is a diagram illustrating examples of moving a cursor position, displaying a length, and displaying a difference value.

FIG. 7 is a diagram illustrating examples of moving a cursor position, displaying a length, and displaying a difference value. FIG. 7 illustrates: two patterns 303 and 304 to be sewn; a starting point 302 of a first selected segment; an ending point 305 of the first selected segment; the first selected segment 306; a length 308 of the first selected segment; a starting point 309 of the second selected segment; a candidate 310 for an ending point; a length 313 of the second selected segment; a difference value 314; and a cursor 301. The cursor 301, which was positioned in the distance lower than a reference value to the candidate 310, moves to the position of the candidate 310 and then positioned on the candidate 310. Since the candidate 310 is displayed, and the cursor 301 moves and is positioned to the position of the candidate 310 under a certain condition, the second selected segment may be easily set to be the same as the first selected segment. Once the position of the cursor 301 is moved, the length of a segment is also changed accordingly, wherein such a segment is acquired by connecting the starting point, input along the second segment, to the point that is on the second segment and that is the closest in distance to the current cursor position. As illustrated in FIG. 7, the length of the first selected segment is the same as the length of the second selected segment. That is, in FIG. 7, the difference value 314 between the length of the first selected segment and the length of a line is displayed 0, wherein the line is acquired by connecting the starting point, input along the second segment, to the point that is on the second segment and that is the closest in distance to the current cursor position.

Figure 8:
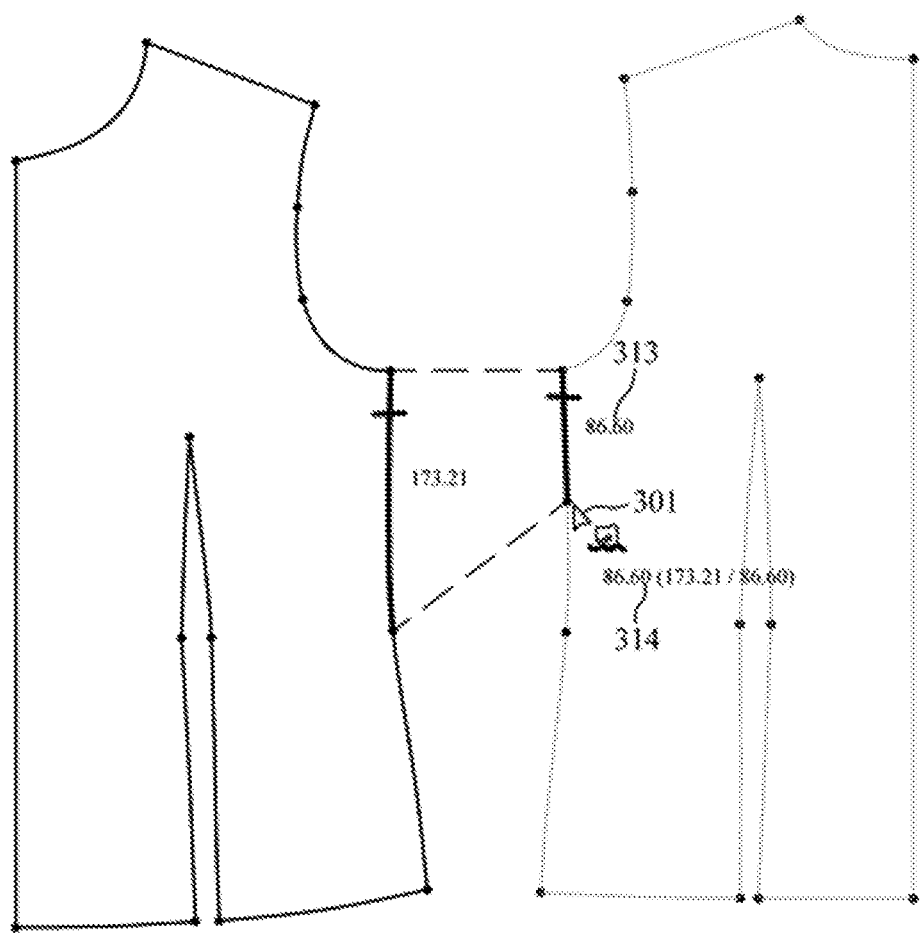
FIG. 8 is a diagram illustrating an example of displaying a difference value and displaying a warning sign.
Figure 9:
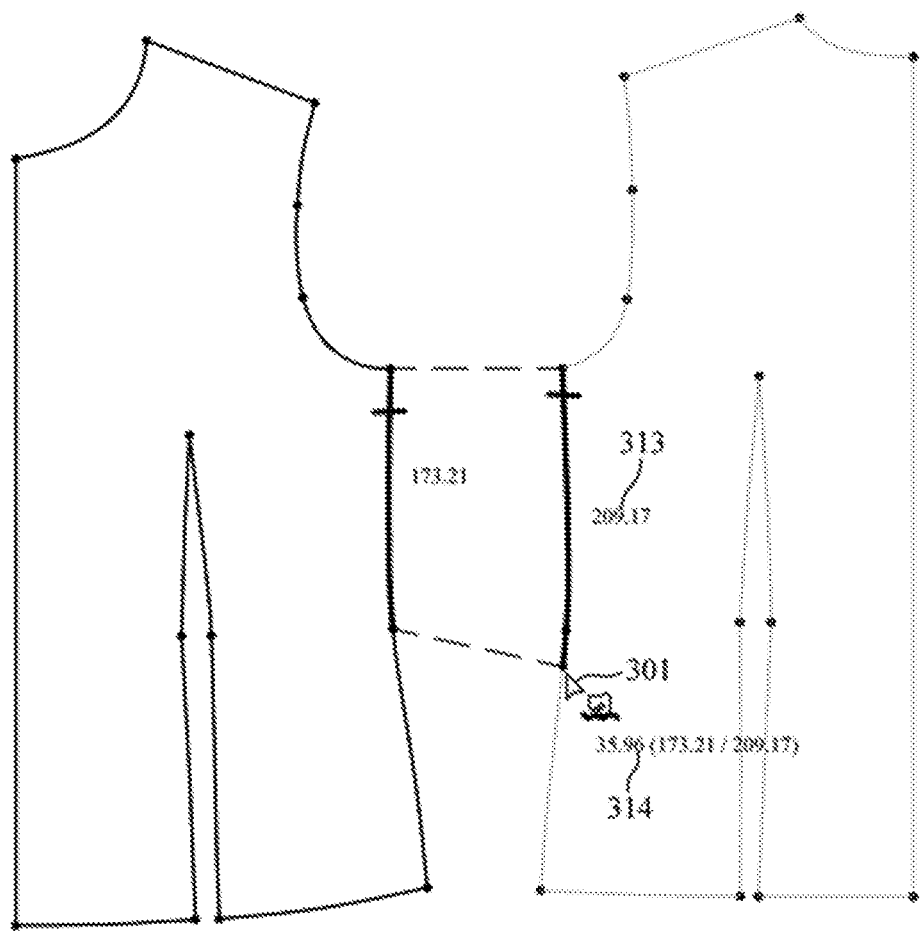
FIG. 9 is a diagram illustrating another example of displaying a difference value and displaying a warning sign.

FIG. 8 is a diagram illustrating an example of displaying a difference value in 27 and displaying a warning sign in 28 and 29. FIG. 9 illustrates: a cursor 301; a length 313 of a line, which is acquired by connecting the starting point, input along a second segment, to a point that is on the second segment and that is the closest in distance to the current cursor position; and a difference value 314 between a length of a first selected segment and the length of a line, which is acquired by connecting the input starting point to a point that is on the second segment and that is the closest in distance to the current cursor position. The length 313 and the length 314 are changed according to the movement of the cursor 301. For example, the difference value 314 illustrated in FIG. 7 is displayed in blue. On the contrary, the difference value illustrated in FIG. 8 is, for example, displayed in red. In FIG. 8, since the second selected segment is shorter than the first selected segment, wrinkles on the clothes may be created when the two segments are sewn together. In other words, in the case the wrinkles are likely to be created when the first selected segment is sewn to the second selected segment, the difference value therebetween may be displayed in red. If the difference value is greater than a reference value, the difference value is displayed in red so as to show a warning sign. Whether wrinkles are created on a 3D pattern may depend on the sewing method, the types of fabric, etc., wherein the 3D pattern is created after the first and second selected segments are sewn together and then through a draping process. For example, knit and chiffon stretching well do not create wrinkles if the difference between the first and second selected segments is lower than one inch. Cotton and denim not stretching well may not create wrinkles if the difference between the first and second selected segments is lower than one centimeter.

FIG. 9 is a diagram illustrating another example of displaying a difference value in 27 and displaying a warning sign in 28 and 29. FIG. 9 illustrates: a cursor 301; a length 313 of a line, which is acquired by connecting the starting point, input along a second segment, to a point that is on the second segment and that is the closest in distance to the current cursor position; and a difference value 314 between a length of a first selected segment and the length of a line, which is acquired by connecting the input starting point to a point that is on the second segment and that is the closest in distance to the current cursor position. The length 313 and the length 314 are changed according to the movement of the cursor 301. For example, the difference value 314 illustrated in FIG. 7 is displayed in blue. On the contrary, the difference value illustrated in FIG. 9 is, for example, displayed in red. In FIG. 9, since the second selected segment is longer than the first selected segment, wrinkles on the clothes may be created when the two segments are sewn together. In other words, in the case the wrinkles are likely to be created when the first selected segment is sewn to the second selected segment, the difference value therebetween may be displayed in red. If the difference value is greater than a reference value, the difference value is displayed in red so as to show a warning sign. Whether wrinkles are created on a 3D pattern may depend on the sewing method, the types of fabric, etc., wherein the 3D pattern is created after the first and second selected segments are sewn together and then through a draping process. For example, knit and chiffon stretching well do not create wrinkles if the difference between the first and second selected segments is lower than one inch. Cotton and denim not stretching well may not create wrinkles if the difference between the first and second selected segments is lower than one centimeter.

Figure 10:
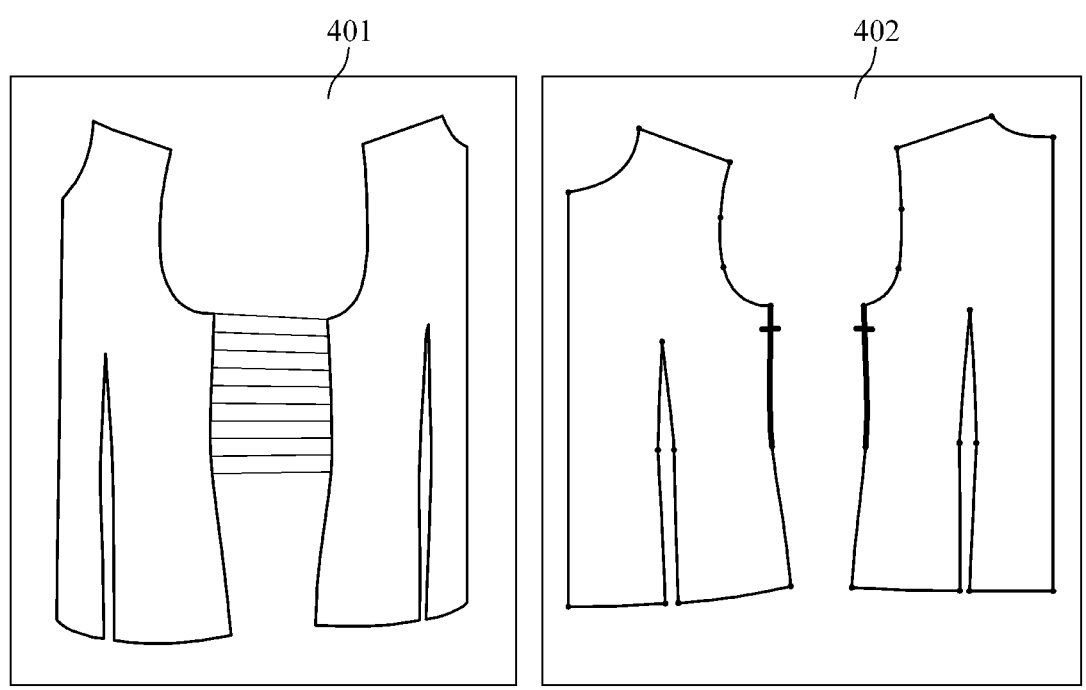
FIG. 10 is a diagram illustrating 2D patterns, and 3D patterns prior to the draping.

FIG. 10 is a diagram illustrating 2D patterns, and 3D patterns prior to the draping. When first and second selected segments on the 2D patterns in a 2D pattern screen 402 are set, the first and second selected segments on the 2D patterns are also set in the positions on 3D patterns in a 3D screen 401, which correspond to the positions of the 2D patterns.

Figure 11:
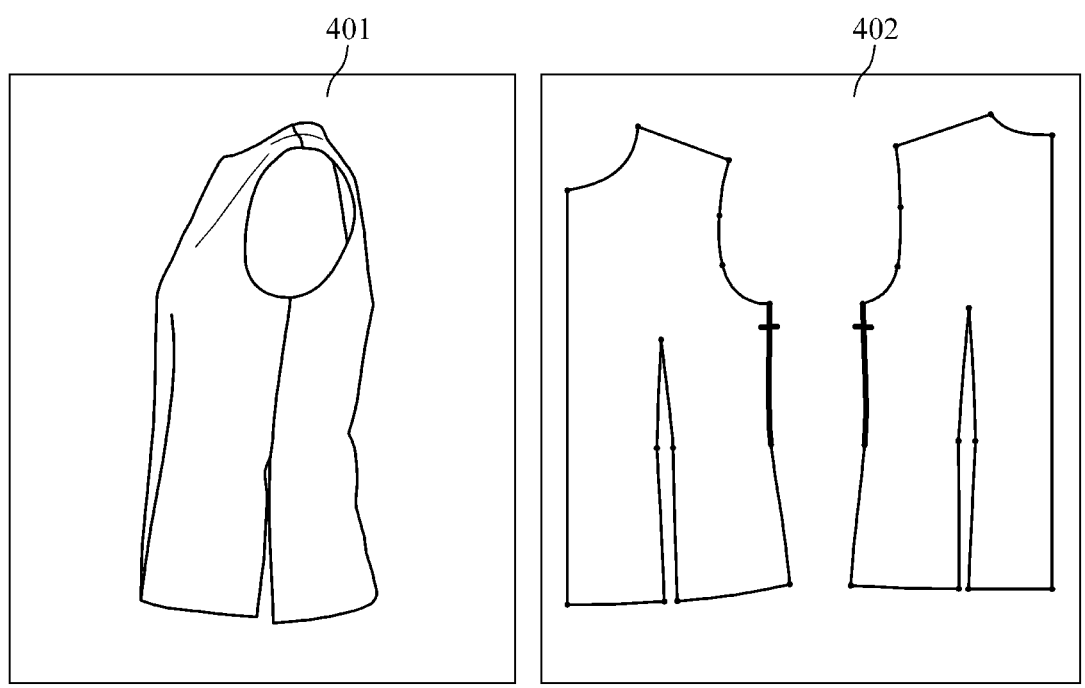
FIG. 11 is a diagram illustrating 2D patterns, and 3D patterns after the draping.

FIG. 11 is a diagram illustrating 2D patterns, and 3D patterns after the draping. After first and second selected segments on 2D patterns in a 2D pattern screen 402 are set, and then sewing instructions are made, the first and second selected segments are sewn together in response to the sewing instructions so that 3D clothing is created. The digital clothing illustrated in the 3D screen 401 is the result acquired by sewing together the first and second selected segments, which have been set, on the 2D patterns in the 2D pattern screen 402.

Figure 12:
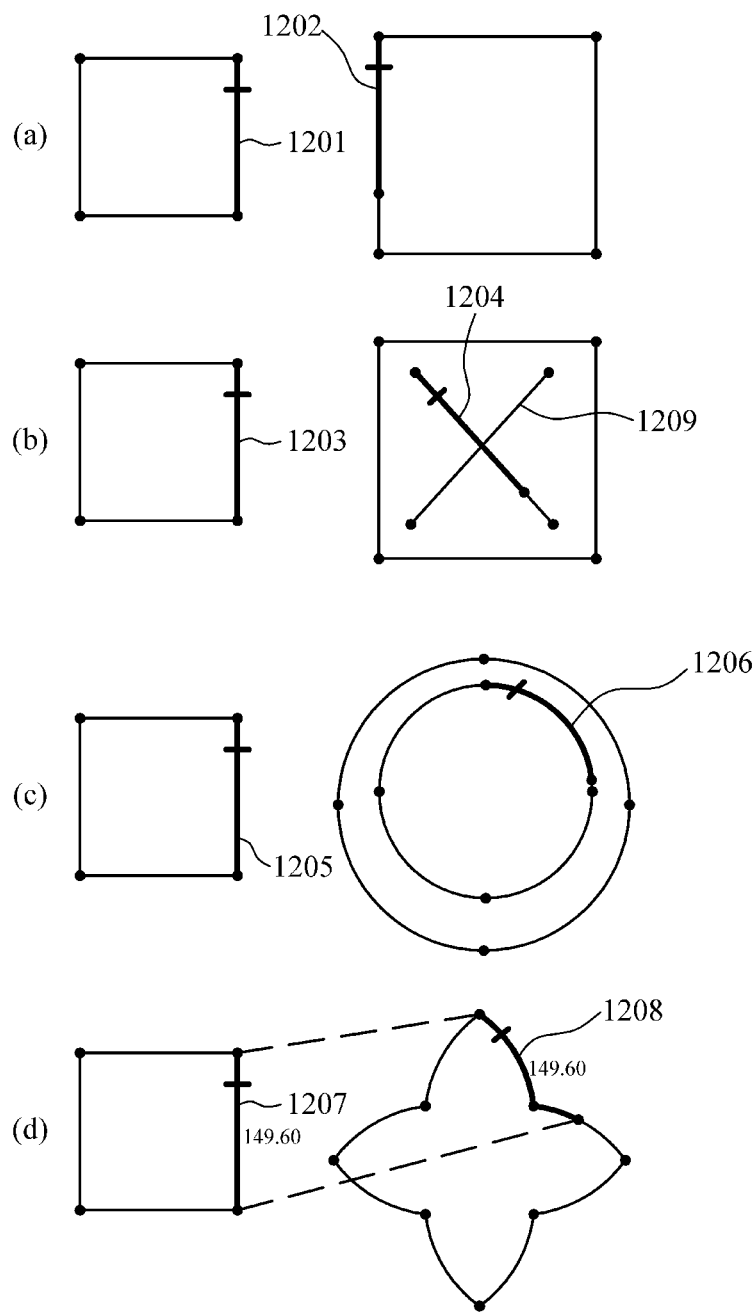
FIG. 12 is a diagram illustrating various shapes of segments in the first and second seam lines.

FIG. 12 is a diagram illustrating various shapes of first and second segments. FIG. 12 illustrates various shapes (a), (b), (c), and (d), each of which illustrates a pair of first and second selected segments.

(a) of FIG. 12 illustrates an example of sewing rectangular patterns, wherein each of a first selected segment 1201 and a second selected segment 1202 is the outline of a rectangle. In (b), a first selected segment 1203 is positioned on the outline of a rectangle, and a second selected segment 1204 is positioned inside a rectangle. As described above, since the selected segment is acquired by connecting two points that is likely to exist on the pattern, the selected segment may be positioned inside the pattern. Second segments 1204 and 1209 are set by a user; and in FIG. 12, a user selects, as the second selected segment 1204, one second segment of two second segments 1204 and 1209. In (c), a first selected segment is positioned on the outline of a rectangle, and a second selected segment is positioned inside a circle. As illustrated in (c), the first and second selected segments may be sewn together even if each of the first and second segments has the different shape e.g., a straight line and a curved line. In (d), a first selected segment is positioned on the outline of a rectangle, and a second selected segment is positioned on the outline of a figure. As described above, even if first and second segments are different from each other, the first and second selected segments may be sewn together. In addition, in the case of (d), even if the second selected segment is positioned inside the figure, the first and second selected segments may be sewn together.

Figure 13:
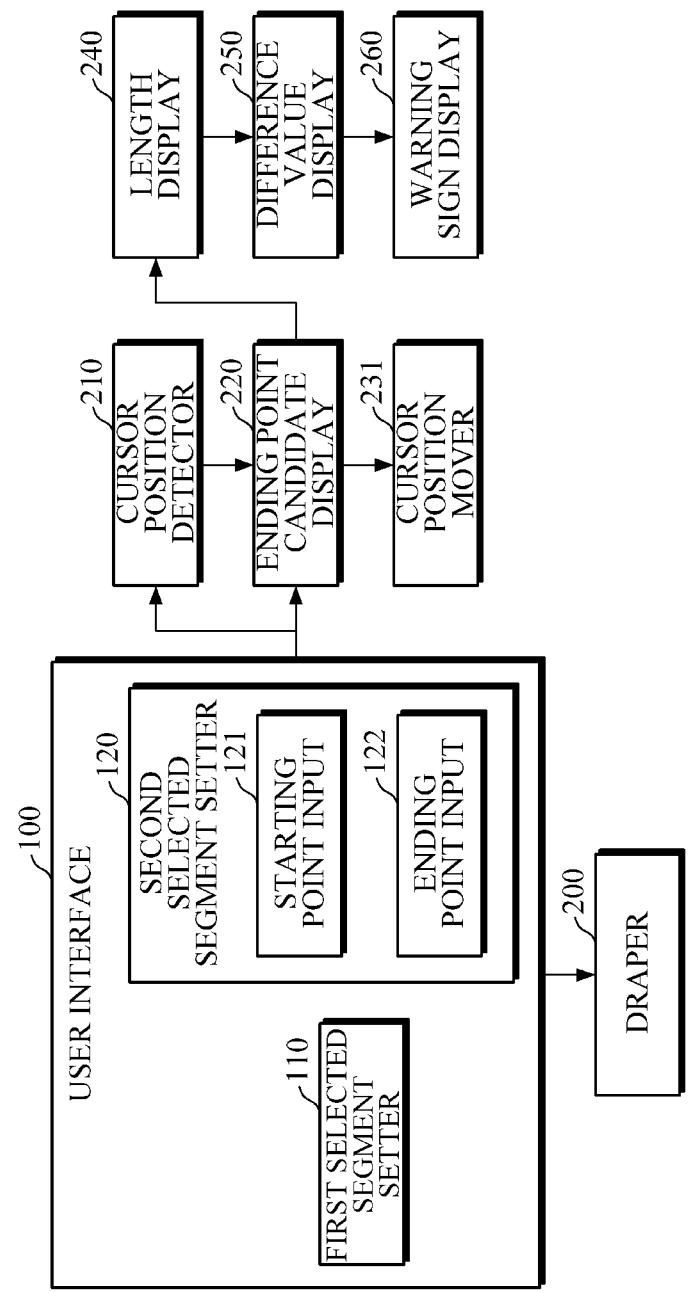
FIG. 13 is a diagram illustrating an apparatus for creating digital clothing according to an exemplary embodiment.

FIG. 13 is a diagram illustrating an apparatus for creating digital clothing according to an exemplary embodiment.

In one exemplary embodiment, an apparatus for creating digital clothing includes a user interface 100 and a draper 200, wherein the apparatus includes a computing element and a storage element that stores patterns and the draped digital clothing.

The interface 100 may include a first selected segment setter 110, which sets a first selected segment, and a second selected segment setter 120, which sets a second selected segment. A user may set the first selected segment and the second selected segment through the interface 100. The user face 100 may include input devices e.g., a key board, a mouse, a touch pen, etc. The user interface 100 may be a computer program, in which a method of creating digital clothing is implemented in terms of software.

The first selected segment setter 110 sets the first selected segment by inputting the first selected segment, which is to be sewn on the first segment on the pattern. The first selected segment setter 110 may input the first selected segment, which is one of the two patterns to be sewn. The method of inputting the first selected segment is directly selecting the part to be sewn through input devices, e.g., a mouse, a touch pen, a keyboard; or enabling a user to select outlines on one pattern, which are provided through a computer program so that a user can select.

In the case in which the first selected segment to be directly sewn is selected through input devices, a starting point and an ending point of the first selected segment are input and selected. In the case in which a cursor, which is output within a screen by input devices, e.g., a mouse and a touch pen, does not exist on any segment of a pattern, a point on a segment that is the closest in distance to a current cursor position may be selected as a starting point or an ending point if the current cursor position has been selected as the starting point or the ending point. The first selected segment setter 110 is specifically described above with reference to FIGS. 3 and 4.

The second selected segment setter 120 may include a starting point input 121, an ending point input 122, and a setter. The second selected segment is sewn to the first selected segment, which will be specifically described later.

The draper 200 sews together the first and second selected segments in response to the sewing instructions so that digital clothing is created. The draper 200 positions 2D patterns around an avatar model, which are then sewn to each other along the selected segments that a user has set. The draper 200 is specifically described above with reference to FIGS. 10 and 11.

The starting point input 121 inputs a starting point of a second selected segment on at least one second segment, which is to be sewn to the first selected segment. The starting point of the second selected segment may be input through input devices e.g., a mouse, a touch pen, a keyboard, etc. In the case in which a cursor, which is output within a screen by input devices, e.g., a mouse and a touch pen, does not exist on any segment on a pattern, a point on a segment that is the closest in distance to a current cursor position may be selected as a starting point if the current cursor position has been selected as the starting point. The starting point input 121 is specifically described with reference to FIG. 5.

The ending point input 122 inputs an ending point, which, upon starting the point-clicking process at the starting point located on the second segment, is the closest in distance to a point, where the point-clicking process occurs, on the second segment that includes the input starting point. If the position of the current cursor is the closest in distance to the second segment, which includes the input starting point, among a plurality of second segments, the point that is the closest to the position, in which the point-clicking process has occurred, is input as an ending point. In the case the point-clicking process occurs when the current cursor is closer to another second segment than the second segment that includes the input starting point, the ending point may not be input. The ending point may be selected so that a length of the second selected segment is the same as the first selected segment, which exemplary embodiments are not limited thereto, and the length of the second selected segment may be different from the length of the first selected segment.

The setter sets, as the second selected segment, the section of the second segment between the input starting point and the input ending point. If the length of the first selected segment is the same as the second selected segment, the digital clothing may be sewn without the wrinkles thereon. If the lengths of the first and second selected segments are not the same, wrinkles are created on the selected segment with the longer length, thus making aesthetic effects. However, even if the lengths of the first and second selected segments are not the same, the wrinkles may not be created according to how much the fabric stretches.

The first and second segments may be at least one of a straight line, a curved line, a multi-branch line, and shapes that include polygons and circles. In the case of the shape of the pattern being a circle, if the entire border of the circle is sewn, the first segment or the second segment may a circle. If the partial border of the circle is sewn, the first segment or the second segment may be a curved line. Various shapes of the first and second segments are specifically described above with reference to FIG. 12.

An apparatus for creating digital clothing may further include a cursor position detector 210 and an ending point candidate display 220.

The cursor position detector 210 detects a current cursor position.

The ending point candidate display 220 determines, as the candidate for the ending point of the second selected segment, a point, which is the closest in distance to the current detected cursor position and which makes the second selected segment the same as the length of the first selected segment along the second segment that includes the input starting point, wherein the second selected segment is made by connecting the input starting point to such a point, and then displaying such a candidate. As the candidate is shown, the ending point on the second selected segment on the pattern may be easily chosen to be the same as the first selected segment. The ending point candidate display 220 is specifically described above with reference to FIG. 6.

The apparatus for creating digital clothing may further include a cursor position mover 231. The cursor position mover 231 moves the position of the cursor to the position of the determined candidate for the ending point and displays it the difference between the current cursor position and the determined candidate for the ending point is lower than a reference value. For example, the reference value may be 15 pixels (px). The reference value may be set freely by a user. If a cursor is located around the candidate for the ending point, the cursor is moved onto the candidate for the ending point so that the second selected segment may be easily set to be the same as the first selected segment. The cursor position mover 231 is specifically described above with reference to FIG. 7.

The apparatus may further include a length display 240. The length display 240 calculates and displays in number at least one of: the length of the first selected segment and the length of the line, which is acquired by connecting the starting point, input along the second segment, to the point that is on the second segment and that is the closest in distance to the current cursor position, which is then displayed in number. The line may be consistently monitored, which is acquired by connecting the starting point, which is input along the second segment changed while the cursor is moved, to the point that is on the second segment and that is the closest in distance to the current cursor position. The length display 240 is specifically described above with reference to FIG. 7.

The apparatus may further include a difference value display 250. The difference value display 250 displays, in number, the difference value between the length of the first selected segment and the length of the line, which is acquired by connecting the starting point, input along the second segment, to the point that is on the second segment and that is the closest in distance to the current cursor position. A user may check the length of the first selected segment and the length of the line, which is acquired by connecting the starting point, input along the second segment, to the point that is on the second segment and that is the closest in distance to the current cursor position. Furthermore, using the difference value 250, a user may check the difference value therebetween. A user may check the difference so as to set the length of the first selected segment to be the same as the length of the second selected segment. The difference value display 250 is specifically described above with reference to FIGS. 7, 8, and 9.

The apparatus may include a warning sign display 260. The warning sign display 260 displays a warning sign when the difference value is greater than a reference value. When the difference value is greater than a reference value, the warning sign display 260 displays the warning sign by changing the colors of the calculated length and the difference value. If the second selected segment is shorter or longer than the first selected segment, wrinkles may be created when patterns is sewn. In other words, depending on whether the wrinkles are created or not when the first and second selected segments are sewn together, the difference value may be displayed in different color. For example, the difference value may be displayed in red. If the difference value is greater than a reference value, the warning sign may be displayed while the difference value is displayed in red. Whether wrinkles are created on the 3D pattern may depend on the sewing method, the types of fabric, etc., wherein the 3D pattern is created after the first and second selected segments are sewn together and then through the draping process. For example, knit and chiffon stretching well do not create wrinkles if the difference between the first and second selected segments is lower than one inch. Cotton and denim not stretching well may not create wrinkles if the difference between the first and second selected segments is lower than one centimeter.

According to the present disclosure, the selected segment on a pattern may be set to be the same as the length of another segment which is to be sewn thereto.

According to the present disclosure, the difference value may be checked when the selected segment on the pattern is not the same as another segment which is to be sewn thereto.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of creating digital clothing executable by a computing device storing digital clothing patterns for draping simulation, the method comprising:
   setting a first selected segment to be sewn on a first segment on a pattern; and
   setting a second selected segment comprising:
      setting a starting point of the second selected segment on a second segment wherein the second selected segment is sewn to the first selected segment,
      determining a present point on the second segment based on a current cursor position,
      moving the present point to a candidate ending point on the second segment, in response to the difference between the present point and the candidate ending point being less than a reference value, wherein the candidate ending point is determined to make a second length of the second selected segment substantially equal to a first length of the first selected segment,
      selecting the present point as an ending point of the second selected segment, in response to a user input, and
      setting as the second selected segment, a section of the second segment between the starting point and the ending point, wherein, when the second length is substantially equal to the first length, at least one of the first length, the second length and a difference value between the first length and the second length is displayed in a first color, and wherein, when the second length is substantially different from the first length, at least one of the first length, the second length and the difference value is displayed in a second color, the second color being different from the first color.

2. The method of claim 1, wherein the first and second segments comprise any one or any combination of any two or more of a straight line, a curved line, a multi-branch line, and shapes that include polygons and circles.

3. The method of claim 1, wherein the setting of the second selected segment further comprises:
calculating either one or both of the length of the first selected segment and the length of the second selected segment.

4. The method of claim 1, further comprising displaying a warning sign, in response to the difference value being greater than a third reference value.

5. A non-transitory computer-readable storage medium storing instructions that, when executed by a processor, cause the processor to perform the method of claim 4.

6. An apparatus for creating digital clothing, the apparatus comprising:
a memory storing digital clothing patterns for draping simulation; and
at least one processor configured to:
set a first selected segment to be sewn on a first segment on a pattern; and
set a second selected segment by:
setting a starting point of a second selected segment on a second segment, wherein the second selected segment is sewn to the first selected segment,
determine a present point on the second segment based on a current cursor position,
move the present point to a candidate ending point on the second segment, in response to the difference between the present point and the candidate ending point being less than a reference value, wherein the candidate ending point is determined to make a second length of the second selected segment substantially equal to a first length of the first selected segment,
select the present point as an ending point of the second selected segment, in response to a user input, and
set as the second selected segment, a section of the second segment between the starting point and the ending point,
wherein, when the second length is substantially equal to the first length, at least one of the first length, the second length and a difference value between the first length and the second length is displayed in a first color, and
wherein, when the second length is substantially different from the first length, at least one of the first length, the second length and the difference value is displayed in a second color, the second color being different from the first color.

7. The apparatus of claim 6, wherein the first and second segments comprise any one or any combination of any two or more of a straight line, a curved line, a multi-branch line, and shapes that include polygons and circles.

8. The apparatus of claim 6, further comprising:
a length display configured to calculate either one or both of the length of the first selected segment and the length of the second selected segment.

9. The apparatus of claim 6, wherein the second selected segment setter is further configured to:
display a warning sign, in response to the difference value being greater than a third reference value.

* * * * *